(12) United States Patent
Comps et al.

(10) Patent No.: US 7,337,175 B2
(45) Date of Patent: Feb. 26, 2008

(54) METHOD OF STORING DATA IN A MULTIMEDIA FILE USING RELATIVE TIMEBASES

(75) Inventors: Christophe Comps, Cestas (FR); Daniel Boudet, Paris (FR); Xavier Sarremejean, Vaureal (FR)

(73) Assignee: Alcatel, Paris (FR)

( * ) Notice: Subject to any disclaimer, the term of this patent is extended or adjusted under 35 U.S.C. 154(b) by 591 days.

(21) Appl. No.: 10/344,648

(22) PCT Filed: Aug. 6, 2001

(86) PCT No.: PCT/FR01/02555

§ 371 (c)(1),
(2), (4) Date: Feb. 13, 2003

(87) PCT Pub. No.: WO02/15046

PCT Pub. Date: Feb. 21, 2002

(65) Prior Publication Data

US 2004/0004885 A1    Jan. 8, 2004

(30) Foreign Application Priority Data

Aug. 14, 2000   (FR)   .................................. 00 10627

(51) Int. Cl.
*G06F 17/30*   (2006.01)

(52) U.S. Cl. ............................ 707/100; 707/1; 84/477; 84/635; 84/645

(58) Field of Classification Search .................. 84/477, 84/645; 707/1

See application file for complete search history.

(56) References Cited

U.S. PATENT DOCUMENTS

| 5,452,435 | A | | 9/1995 | Malouf et al. |
| 5,721,827 | A | * | 2/1998 | Logan et al. ................ 709/217 |
| 5,869,782 | A | * | 2/1999 | Shishido et al. .............. 84/609 |
| 5,883,957 | A | * | 3/1999 | Moline et al. ................ 705/57 |
| 5,914,916 | A | * | 6/1999 | Totsuka et al. ............. 369/30.1 |
| 6,166,313 | A | * | 12/2000 | Miyamoto ................ 84/477 R |
| 6,429,365 | B1 | * | 8/2002 | Ide et al. ...................... 84/635 |

FOREIGN PATENT DOCUMENTS

WO    WO 9427234    11/1994

OTHER PUBLICATIONS

K. Rothermel et al, "Clock hierarchies: An Abstraction for Grouping and Controlling Media Streams" IEEE Journal on Selected Areas in Communications, US, IEEE, Inc. NY, vol. 14, No. 1, 1996, pp. 174-184, XP000548820.

* cited by examiner

*Primary Examiner*—Don Wong
*Assistant Examiner*—Hanh Thai
(74) *Attorney, Agent, or Firm*—Sughrue Mion, PLLC

(57) ABSTRACT

The invention concerns a method for storing data in a multimedia file, the multimedia file containing an absolute time base indicator and at least a track wherein the data are stored. Said data comprise time values. The method is characterised in that it consists in associating with each track; at least a relative time base indicator which is a function of said absolute time base, and in determining some or all the time values contained in a track, with respect to a relative time base indicator associated with said track.

15 Claims, 2 Drawing Sheets

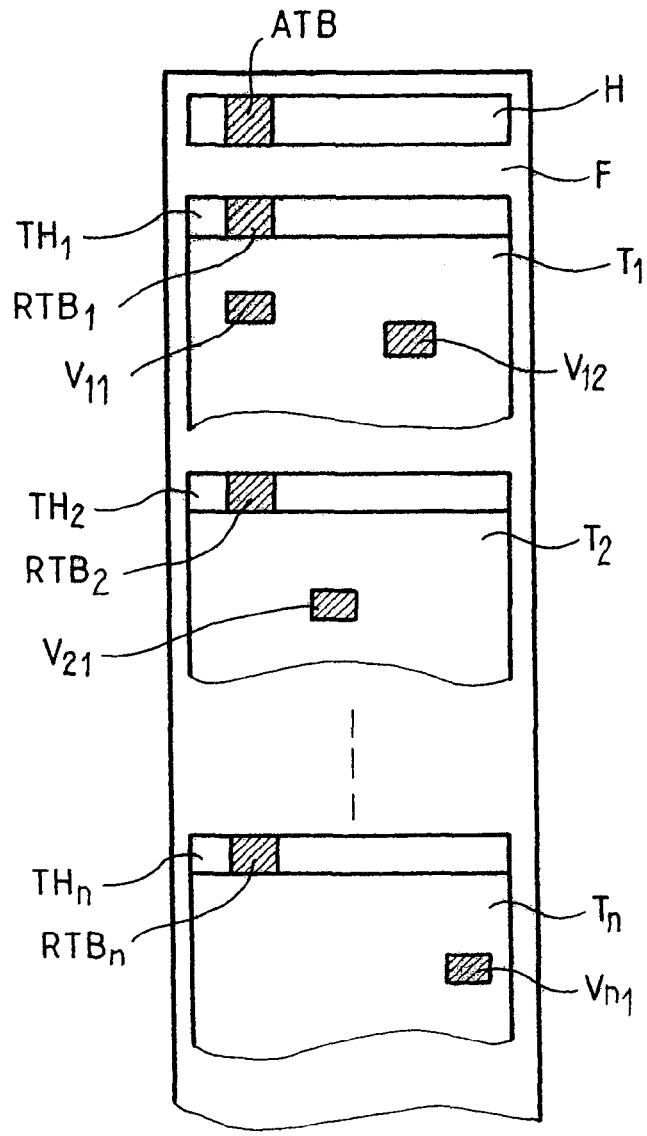
FIG_1
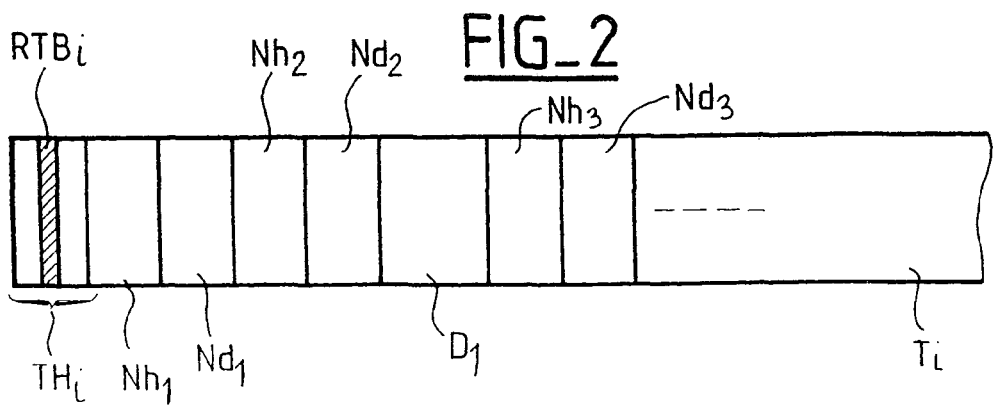
FIG_2

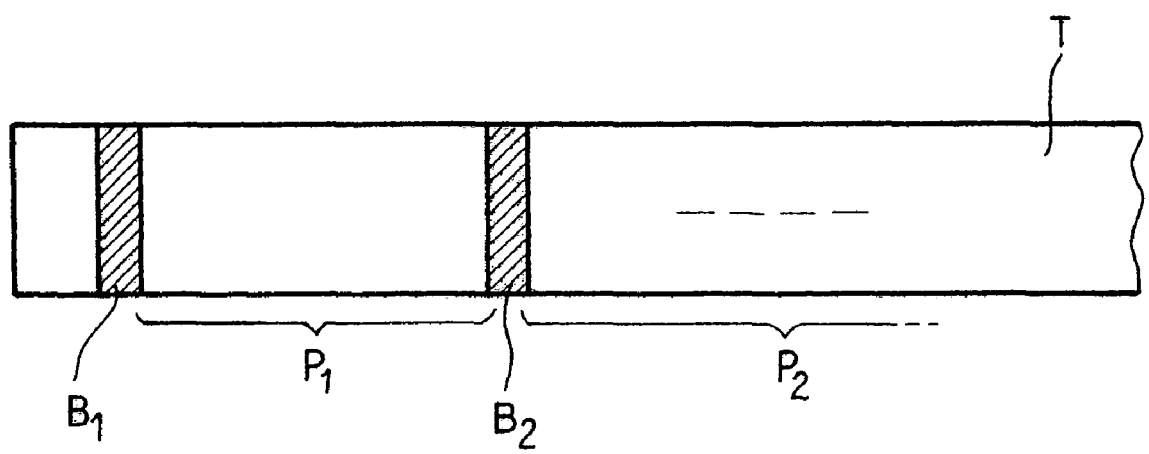
FIG_3

METHOD OF STORING DATA IN A MULTIMEDIA FILE USING RELATIVE TIMEBASES

The present invention relates to a method of storing data in a multimedia file. It applies with particular benefit to onboard systems such as mobile telephones, pocket computers and any other device that has to have multimedia capabilities and for which the size of multimedia files and the computing power needed to process them constitute a problem.

There are many methods of storing data in monomedia files, i.e. files concerning only one particular type of data. Examples that may be cited include the JPEG (Joint Photographic Expert Group) format for storing images, the WAV format for storing sound data, the RTF (Rich Text File) format for storing text, etc.

There are also methods of storing data in multimedia files, i.e. files integrating data of different kinds. An example that may be cited is the MPEG (Motion Picture Expert Group) format integrating sound and video data.

MIDI (Musical Instrument Digital Interface) files store sound data in files structured into tracks, each track usually corresponding to one musical instrument. The data contained in each track can be time values (i.e. durations of notes or times between successive notes). These time values are given as a function of an absolute timebase whose value is inserted into a header of the MIDI file in the form of two fields, a time signature and a tempo.

Each time value is coded in the form of the multiplicand value of the absolute timebase. For example, if the timebase is 100 ms, a duration of 1 s is coded 10.

The absolute timebase principle works well only if all the time values are of the same order of magnitude. This is generally the case in a MIDI file, in which all of the data concerns sound.

However, in the context of a multimedia file incorporating data of different kinds, this absolute timebase principle is no longer satisfactory.

This is because the time values can be very heterogeneous, as a function of the type of data. For example, time values concerning a sequence of images are generally a few seconds, whereas time values for musical sequences are around 100 ms.

If the absolute timebase principle as described in the MIDI file specifications is used, the timebase must be less then or equal to the smallest time value in order to cater for all time values.

Consequently, the highest values are then coded on a large number of bits.

For example, with an absolute time base of 100 ms, a time value of 10 seconds is coded 100. Consequently, the time values must be coded on a minimum of seven bits per value.

In the context of an onboard system, there are severe constraints on file size:
Firstly, the memory available is limited for reasons of overall size and battery life.
Secondly, multimedia files may need to be downloaded from a server center, and the call time is directly related to their size.

The object of the present invention is to reduce the size of multimedia files whilst enabling the storage of all types of data.

To this end, the invention provides a method of storing data in a multimedia file containing an absolute timebase indicator and at least one track in which said data is stored. Said data includes time values.

The method is characterized in that each track is associated with at least one relative timebase indicator, as a function of said absolute timebase, and in that some or all time values contained in a track are determined relative to a relative timebase indicator associated with said track.

The invention and its advantages will become more clearly apparent in the course of the following description, which is given with reference to the accompanying drawings.

FIG. 1 is a diagram showing a multimedia file conforming to the invention.

FIG. 2 is a detailed view of a track contained in a multimedia file according to the invention.

FIG. 3 shows a different embodiment of the invention.

According to the invention, the data can be time values. The time values can represent a duration, a start value or an end value of a presentation to a user, or other data (image, sound, text, etc.). It can thus be the time of display of an image, or the time for which a musical note is held, or the time at which the note starts, or the wait time between two events, etc.

FIG. 1 is a diagram showing the structure of a multimedia file F according to the invention which contains a header H and a plurality of tracks $T_1, T_2, \ldots, T_n$.

The header H includes diverse information common to all tracks (identification, etc.) that are not detailed separately apart from an absolute timebase (ATB) indicator.

The ATB determines the smallest time value that can be present in the multimedia file. It can be calculated as the highest common factor (HCF) of all time values in the multimedia file F.

As previously stated, the multimedia file F further includes a set of tracks $T_1, T_2, \ldots T_n$ (possibly a single track). Each of the tracks can be dedicated to a single type of data. For example, track $T_1$ can include a sequence of images, track $T_2$ can be a MIDI track, track $T_n$ can include sequences of text messages, etc. These various tracks can be intended to be read and presented to the user simultaneously.

The tracks may contain time values associated with other data contained in the track. This association can take various forms:
Each data item can be systematically followed by a numerical value. This method can be used to specify the duration of presentation of a data item, for example (duration of a note, etc.).
Time values can also be inserted optionally, as and when required. This method can be used to specify a time-delay between two presentations of data, for example. The omission of this time value can then signify that the two data items must be presented simultaneously (as in the case of a chord mode up of several notes, for example).

These two possibilities can be combined and it is entirely possible to use other arrangements without departing from the scope of the invention.

FIG. 2 shows the structure of a track contained in a multimedia file conforming to the invention. In this example, the track contains only sound data.

The track $T_1$ includes a header $TH_t$ and data relating to sound. A first field $Nh_1$ represents the pitch of a first note and a second field $Nd_1$ represents its duration. Similarly, the fields $Nh_2$ and $Nd_2$ define a second note.

The field $D_1$ represents a time-delay, i.e. a wait time before presenting the subsequent notes of the track.

The fields $Nh_3$ and $Nd_3$ respectively represent the pitch and the duration of a third note.

The fields defining a note or a time can therefore follow on in sequence in the track $T_i$.

The header $TH_i$ of the track $T_i$ includes a relative timebase indicator $RTB_i$. The value of the relative timebase is given as a function of the absolute timebase ATB.

In one embodiment of the invention, durations are determined as a function of the relative timebase $RTB_i$ and the times between notes only as a function of the absolute time base ATB.

Accordingly, the time values $Nd_1$, $Nd_2$, $Nd_3$ are determined with respect to the relative timebase $RTB_i$ while the time value $D_1$ is determined with respect to the absolute timebase ATB.

Similarly, in FIG. 1, the tracks $T_1$, $T_2$, ... $T_n$ include respective headers $TH_1$, $TH_2$, ... $TH_n$. Each header contains a respective relative timebase indicator $RTB_1$, $RTB_2$, ... $RTB_n$.

A different embodiment could store these timebase indicators outside the track headers, for example in a table contained in the header H of the multimedia file.

Each track additionally contains time values $v_{11}$, $v_{12}$, $v_{21}$, $v_{n1}$ determined relative to the relative timebases. A time value is preferably determined relative to the timebase indicator contained in the same track as itself.

The table below gives one numerical example for the time values represented in FIG. 1:

| | |
|---|---|
| $V_{11}$ | 100 ms |
| $V_{12}$ | 150 ms |
| $V_{21}$ | 0.5 s |
| $V_{n1}$ | 6 s |

The absolute timebase is defined as the highest common factor of all time values. Thus here the absolute timebase indicator ATB takes the value 50 ms.

The relative timebases $RTB_1$, $RTB_2$ and $RTB_n$ are then defined as the highest common factors of the time values contained in their respective tracks.

Thus there is a relative timebase equal to 50 ms for track 1, 500 ms for track 2, and 6 s for track n.

The values of the relative timebase indicators are therefore:

$RTB_1 = 1$
$RTB_2 = 10$
$RTB_n = 120$

The time values are then determined relative to these relative timebase indications, and the following table of values is obtained:

| | |
|---|---|
| $V_{11}$ | 2 |
| $V_{12}$ | 3 |
| $V_{21}$ | 1 |
| $V_{n1}$ | 1 |

If the time values had been coded using only an absolute timebase, it would have been necessary to code time values from twice to 120 times the absolute timebase. It would therefore have been necessary to code the time values on seven bits.

Using relative timebases, the time values range from only one to three and therefore can be coded on only two bits.

Consequently, the method according to the invention provides a saving of 5*(7 bits−2 bits)−3*7 bits=4 bits.

The first term represents the saving on the five time values present. The second term is the loss due to adding relative timebase indicators to the headers of the three tracks $T_1$, $T_2$ and $T_n$.

If the number of time values increases, the loss due to this second term decreases in the same proportion.

In a real situation, i.e. that of a file with a few hundred kilobytes or even several megabytes, the saving can be as high as around 20%.

FIG. 3 shows a different embodiment in which the relative timebase indicators can be inserted into a track T outside the header. In this case, a plurality of timebase indicators $B_1$, $B_2$ can easily be associated with the same time T.

To be more precise, each relative timebase indicator is uniquely associated with a portion of the track. In FIG. 3, for example, the timebase indicator $B_1$ is associated with the portion $P_1$, the timebase indicator $B_2$ with the portion $P_2$, and so on.

A timebase indicator preferably defines an associated portion that follows it immediately and which terminates at the next timebase indicator.

In other words, the time values contained in a track are defined relative to the timebase indicator that immediately precedes it.

An advantage of this kind of implementation is to be easily able to take account of local variations of the timing of the multimedia data to be stored. Thus in the case of musical data, the tempo may change from a slow tempo (for example a largo, to use classical music terminology) to a brisk tempo (for example, an allegro) in the same track.

In this case it is beneficial to insert a relative timebase indicator at the beginning of the change to the brisk tempo to adapt the timebase to the time values to be coded.

The invention claimed is:

1. A method of storing data in at least one track of a multimedia file comprising:
   associating each track with at least one relative timebase indicator, as a function of an absolute timebase indicator;
   determining at least some of time values contained in a respective track relative to a respective relative timebase indicator associated with said track; and
   storing said data in said multimedia file comprising the absolute timebase indicator, said at least one relative timebase indicator, and said least one track in which said data is stored, said data comprising said time values including said determined at least some of the time values, wherein the relative timebase indicator is an indicator of a timebase common to the at least some time values in the track, wherein the absolute timebase indicator is an indicator of a timebase common to all time values in the multimedia file, and wherein the determining comprises determining duration of said at least some time values in the track based on the relative timebase indicator.

2. A method according to claim 1, wherein each relative timebase indicator is stored in the track with which it is associated.

3. A method according to claim 1, wherein each of said tracks is dedicated to a single type of data.

4. A method according to claim 1, wherein each relative timebase indicator is defined as the highest common factor of the time values contained in the track with which it is associated.

5. A method according to claim 1, wherein a plurality of relative timebase indicators are associated with the same track and each of said relative timebase indicators is associated uniquely with a portion of said track.

6. A method according to claim 1, wherein each relative timebase indicator is defined as the highest common factor of the time values contained in the portion with which it is associated.

7. A method according to claim 5, wherein each time value is defined relative to the relative timebase indicator that precedes it in the track containing it.

8. The method according to claim 1, wherein said determining comprises determining all of said time values contained in said track relative to the relative timebase indicator associated with said track, and wherein said time values comprise at least two out of a group of a duration, time between successive events, start time, and end time of a presentation to a user.

9. A method of storing data in at least one track of a multimedia file comprising:
   generating one relative timebase indicator for each track, wherein the relative timebase indicator is a function of an absolute timebase indicator,
   storing, in each track, a respective generated relative timebase indicator;
   determining at least some of time values contained in a respective track relative to the relative timebase indicator associated with said track; and
   storing said data in said multimedia file comprising said absolute timebase indicator and said least one track in which said data is stored, said data comprises said determined time values, wherein the relative timebase indicator is an indicator of a timebase common to the at least some time values in the track, wherein the absolute timebase indicator is an indicator of a timebase common to all time values in the multimedia file, and wherein the determining comprises determining duration of said at least some time values in the track based on the relative timebase indicator.

10. The method according to claim 9, wherein the time data comprises a duration, a time value between events, a start value, and an end value of a presentation to a user.

11. The method according to claim 9, wherein the time data comprises a duration and a time value between events, and wherein the duration is determined as a function of the relative timebase indicator and the time between events is determined as a function of the absolute database indicator.

12. The method according to claim 9, wherein said multimedia file comprises a header and a plurality of tracks, wherein the header of said multimedia file comprises information common to all tracks including the absolute timebase indicator, and wherein each track comprises a header in which a respective relative timebase indicator is stored.

13. The method according to claim 12, wherein the absolute timebase indicator determines smallest time value possible in said multimedia file.

14. The method according to claim 12, wherein the absolute timebase indicator is a highest common factor of all values of said time data and the relative timebase indicator is a highest common factor of all values of said time data within a respective track, and wherein all of the time values stored in said track are determined relative to the relative timebase indicator associated with said track.

15. The method according to claim 1, wherein the relative timebase indicator is an indicator of a timebase common to the at least some time values in the track, wherein the absolute timebase indicator is an indicator of a timebase common to all time values in the multimedia file, and wherein the determining comprises determining duration of said at least some time values in the track based on the relative timebase indicator.

* * * * *